(12) United States Patent
Smith (10) Patent No.: US 8,271,346 B1
(45) Date of Patent: Sep. 18, 2012

(54) SYSTEM TO FORMAT AND USE ELECTRONICALLY READABLE IDENTIFICATION DATA STRINGS, BIOMETRIC DATA, MATRIX CODES AND OTHER DATA TO LINK AND ENROLL USERS OF PRODUCTS AND SERVICES TO ROLES AND RIGHTS AND FEES AND PRICES ASSOCIATED WITH RESEARCH PROTOCOLS LINKED TO SAID PRODUCTS AND SERVICES

(76) Inventor: Stan Smith, Fort Mill, SC (US)

( * ) Notice: Subject to any disclaimer, the term of this patent is extended or adjusted under 35 U.S.C. 154(b) by 0 days.

(21) Appl. No.: 13/271,157

(22) Filed: Oct. 11, 2011

Related U.S. Application Data

(63) Continuation-in-part of application No. 12/932,798, filed on Mar. 7, 2011.

(51) Int. Cl.
*G06Q 30/00* (2006.01)
(52) U.S. Cl. .................................................. 705/26.1
(58) Field of Classification Search .................. 705/26.1
See application file for complete search history.

(56) References Cited

U.S. PATENT DOCUMENTS

2011/0106597 A1* 5/2011 Ferdman et al. ........... 705/14.11
* cited by examiner

*Primary Examiner* — Mila Airapetian (57) ABSTRACT

The system and method uses strings of computer readable characters, such as QR Codes, biometric data captured from electronic devices, and RFID tags to link contributors to a data supply chain upon transmission from electronic devices that transmit said data strings. The electronically readable identification data strings include connection and context information for enrollees, regulators, and providers of services and products to be subscribed to asynchronous notifications and alerts as well to exchange fees, incentives, and rewards for contributions, participation, and access. Enrolled contributors are enabled to interact with electronic devices or websites or servers to contribute observations and data into protocols or otherwise participate in a data supply chain. In some instances, links between a server and electronic devices capable of overwriting computer readable character strings or matrix codes will be implemented and fees charged for revising said data strings upon acceptance of a version transmitted by enrolled contributors.

7 Claims, 4 Drawing Sheets

Figure 2.    Diagram of System Components

Figure 3. Diagram of System Roles, Actors, Entities

SYSTEM TO FORMAT AND USE ELECTRONICALLY READABLE IDENTIFICATION DATA STRINGS, BIOMETRIC DATA, MATRIX CODES AND OTHER DATA TO LINK AND ENROLL USERS OF PRODUCTS AND SERVICES TO ROLES AND RIGHTS AND FEES AND PRICES ASSOCIATED WITH RESEARCH PROTOCOLS LINKED TO SAID PRODUCTS AND SERVICES

BACKGROUND OF THE INVENTION

1. Field of the Invention

The system and method of the invention described herein relates to the enrollment of participants into a data supply chain through configuration and hardlinking or object hyperlinking or transmission of electronically readable identification strings of data, biometric data, matrix or two dimensional codes, and other strings of identification data readable by electronic devices. More specifically, it introduces art to format and configure electronically readable identification data or biometric data or matrix codes that conform to one or a plurality of metadata standards including formatting, configuring, and joining codes or strings of characters to enroll contributors, collectors, auditors, and users of data into a data collection and processing method and system to use for research or risk management or quality control or performance feedback to manufacturers or service providers or individual actors or persons upon sale or distribution or exchange of a product or service; also including transaction fees, payment, and other methods for compensating participants for roles undertaken within the data supply chain. Included within the one or a plurality of forms of electronically readable identification to implement the enrollment process is registration for receipt of notifications, alerts and updates to be transmitted to the enrollee, and assignment of the enrollee to roles and functions within the data supply chain. A further aspect of the invention described herein is allocation of prices and fees for users exercising their roles and rights within a data supply chain. The system and method further includes use of electronic devices to transmit and update data strings of biometric information, matrix codes, data from RFID tags, and electronically readable identification codes within electronic devices as information associated with an enrollee or a product or service or a person providing a service changes.

2. Description of the Related Art

Adverse side effects of medications and product defects in manufactured biological and chemical agents or medical or protective devices and equipment can result in harm or loss. Indeed, many products or services may pose a risk to users, purchasers or recipients. Product recalls of automobiles, food, toys, and medicines that were thought to be safe occur with regularity. Gaps in time between trends in data indicating risk and analysis and action regarding said risk can result in unnecessary loss of lives and property. Implementing a rapid enrollment system and method to facilitate input into datasets to be used for data analysis or to trigger notifications and feedback to manufacturers, providers, users, regulators, and other vested parties will enable early warning of emergent problems and rapid response to risks associated with a product or service. Notifications, alerts, and other communications enabled through the system and method of the invention described herein distributed to participants in a data supply chain including regulatory agencies, manufacturers, service providers, and individual end users of products and services will enable better management of risks and liabilities in real time. Monetizing the enrollment event may motivate participation in a data supply chain. Additionally, assigning values and prices and other rewards to rights and roles assigned participants in a data supply chain through the enrollment process structures and rationalizes widely distributed yet flexible participation.

The Department of Homeland Security and the FDA are encouraging development of systems and methods for real time tracking of the distribution, utilization, and positive or adverse impacts of biological and chemical agents or equipment that may be distributed through emergency response channels or through standard retail and other distribution channels and outlets during emergency events. Enrolling users of products and services into feedback processes, especially feedback processes for vaccines pharmaceuticals or medical devices, will support statutory and regulatory requirements to track risks and other data or information following regulatory approval and upon inclusion into distribution networks. Studies of long term effects and interactions of medications or services, such as medical procedures, also may uncover unanticipated adverse effects.

The invention described herein has a preferred embodiment that includes formatting a QR Code or any of the many variants of matrix codes or other identification codes, including biometric identification, to associate a product or service or procedure with an end user or customer. Upon transfer or implementation or purchase or initiation of use of a product or service or procedure, a link between said end user or customer and other participating entities in a data supply chain can be established. For example, the recipient of the product as well as the vendor and provider can enroll to access data collection protocols as data contributors or to serve other roles within a data supply chain.

The term "data supply chain" is intended to describe a linked system of data contributors, protocols and formats for collection of data, data from automated entry and posting processes, input from persons that vet audit and analyze data, triggers and other processes and calculations that mark achievement of positive or negative thresholds of values within the dataset, server or electronic device and human actions resulting from trigger thresholds being reached or surpassed, communications notifications or additional server or electronic device actions involving or forwarded to contributors and other participants, and other forward or backward chains of server or electronic device actions that may be initiated by achievement of trigger conditions including allocation of transaction fees prices awards charges and other exchanges of social or physical currencies among participants in the data supply chain and process. The value of a right or a role within a data supply chain may vary. Users who contribute observations or data may be allocated a payment per contribution; while those who review or audit observations may be allocated a different level of payment or reward. In contrast, users who access a portion of a data supply chain may be charged or fee for the right to view or download or access or may be assigned a right to receive a notification or other action resulting from the operation of the data supply chain. The allocation of payments or charges will vary according to the value propositions and decisions of managers of the data supply chain regarding rights and roles for interaction with said data supply chain.

An additional use of electronically readable identification strings or biometric data or matrix codes in the invention described herein is the optimal assignment to a potential enrollee of an electronically readable identification string such as a string of biometric data and a matrix code or an RFID tag that includes identity data and other forms of identifying data thus enabling enrollment data to be enriched. Enrollment of contributors may be automated through use of said electronically readable identification strings or biometric data or matrix codes or RFID tags when transmitted or exchanged by electronic devices. Enrollment of service providers or product manufacturers into a data supply chain may also be achieved through use of electronically readable identification strings or matrix codes from said providers or product manufacturers. A further use of data strings or matrix codes includes assignment of a data string or matrix code to associate with each product or service or procedure the service provider or manufacturer elects to link into the data supply chain, thus registering said product or service or procedure or a variant of said product or service or procedure. Thus, there are six kinds of participation within a data supply chain; first, the producer or manufacturer or provider of the product or service or procedure that is to be associated with observations; second, the product or service or procedure or even the person or employee that is the target or recipient of observations; third, the persons or devices that generate and input observations about the target or recipient of the observations; fourth, the persons or equipment that vet or validate observations for processing and other actions, such as routing notifications and reports regarding the observations to any of the entities participating in the data supply chain; fifth, the regulatory or financial processing entity that may not be in a direct relationship with the targets of observations, but may be enabled to interact with the datasets within the data supply chain and be included in notification and reporting in order to do external reviews or to allocate and implement payment or exchange of fees prices and other rewards to other participants; and sixth, where the participants does not participate in improving or changing the content of the data supply chain, yet may view or review or download data or be the recipient of server actions generated by changes within the data supply chain.

Electronically readable identification within RFID tags, embedded chips, and two dimensional matrix codes can carry significantly more data than earlier constructs for code strings, such as UPC codes; and are now capable of including data from an enrollee's medical history, biometric data, and financial and transactional information for posting to one or a plurality of datasets on a server or device homing the enrollee's enrollment information. Electronic devices capable of capturing biometric data may also post or append said data to an enrollee's enrollment or registration information.

Structuring automated enrollment and payment or incentives for real time end user input into a disciplined research process included within a well designed data supply chain will advance the public interest. The invention described herein can further be folded into any of the processes for offering reviews and feedback through social networks and through direct registration or subscription to feedback formats and processes on websites managed by manufacturers or producers as well as by software as a service (SaaS) vendors. The invention described herein can further be applied to risks associated with behavior of persons operating as representatives of agencies or organizations in a fashion similar to application of the invention to capturing data regarding impact or consequences resulting from use of a service or product.

Art to implement data supply chain and provide incentives to participate in data supply has been evolving. The invention described herein advances the advantages of the data supply chain with triggered real time notifications introduced by Smith (U.S. Pat. No. 7,860,760). That system and method, Smith (U.S. Pat. No. 7,860,760), enables pricing of notifications and server actions triggered by new or updated data streamed or posted into a dataset. Art introduced through Smith (Ser. No. 12/930,280) enables pricing of a data item for inclusion into a data supply chain by its popularity as a search terra Smith (Ser. No. 12/932,798) of which this invention is a Continuation in Part also teaches art to weight and price contributions from variably weighted sources and variably weighted observations of research targets or data items. Additional art introduced by Smith (Ser. No. 12/932,797) describes a system and method for calculating fees for interaction of a user with a graphical user interface (GUI) on a website or host server housing a dataset or a plurality of datasets accessible through said GUI. The invention described herein enables enrolled participants to interact with GUI's as described by Smith (Ser. No. 12,932,797) if the data collector or enrolled data contributor opt to engage in the pricing and fee exchanges of that system and method. Further art introduced by Smith (Ser. No. 13/134,596) offers a system and method to facilitate and price data exchange from electronic devices linked to the systems and methods of Smith (U.S. Pat No. 7,860,760, Ser. Nos. 12/932,797, and 12/932, 798). Art has also been described, Smith to integrate fees and rewards for incremental improvements, updates, and additions of data to data accumulation processes within Social Networks or networks of users and servers or websites. Smith (Ser. No. 13/136,421) further introduces a system and method for pricing linking of message streams and RFID tags and UPC codes to data sources. That invention, Smith (Ser. No. 13/136,421), deals with pricing uploading of data and data streams through electronic devices, rather than enrollment of participants into a data supply chain. The invention described herein takes a different approach to pricing and inclusion by addressing pricing and fees for enrollment registration or subscription and prices and fees for variants of roles and rights assigned to participants in a data supply chain.

While each of the systems and methods of the systems, and methods of the patent and patent applications cited herein can be implemented completely independently of one another, an integration of all said cited systems and methods will facilitate the social objective of encouraging the evolution of real time data supply chains to reduce risks and leverage knowledge and information. The art described in the invention herein provides a method and system for rapid enrollment of participants into a data supply chain. At every point within a data supply chain, transaction fees and prices can be implemented and established for enrolling and registering data contributors.

Clinical Research Organizations (CRO's) and other research service providers enroll contributors of data and feedback into research processes and programs that include access to formal protocols. For example, CRO's enlist interviewers or agents to collect data from physicians who are in a position to observe risks or side effects; or CRO's provide survey forms (often called "protocols") and materials for physicians or other health care providers to complete regarding observations of side effects and drug interactions and medical outcomes. Often, responses to questions on survey forms are manually entered into datasets by data entry technicians or entered through electronic devices implementing survey form reading software, introducing a potential for data entry errors. Additionally, when CRO's conduct telephone surveys and use other forms of personal contact such as office visits and interviews to actively collect data from users of pharmaceuticals or other products, the agents or equipment collecting the information may misinterpret or inaccurately record the information. The system and method of the invention for rapid enrollment of contributors to research protocols described herein reduces the lag time between end users of products and services initiating use of a product or service and the registering and posting observations of side effects or responses to a pharmaceutical or medication, increasing the potential for timely accurate structured data entry. Broadly distributed enrollment of contributors into a data supply chain can also supplement, enhance, and serve to check or verify the quality of data obtained through personal interaction and interviews, especially if control or comparison groups are part of follow on study processes for long term outcomes, for side effects, and for unanticipated adverse impact.

Another common method for collecting data is to email a link to the website housing a survey to a potential contributor. Manufacturers and service providers often retain SaaS vendors that offer email linking and other survey research capabilities. Companies and services such as SurveyMonkey or Zoomerang enable researchers to construct and deliver surveys and link contributors into survey administration processes. Research and survey organizations like Gallup and Gartner also structure temporary or permanent links between their sites and distributed groups of contributors to collect input into survey research forms. Data collected through these survey research organizations is analyzed at intervals; sometimes even regular intervals. However, the delay between input and analysis and notification of persons or entities that might be subject to risks or liabilities can be costly. The system and method described herein integrates communication and notification methods upon enrollment to reduce the lag time between discovery of risk and alerting enrollees and other parties included into the data supply chain.

An industry has evolved to enable the processing and interpretation of data gathered through survey collection tools. Art introduced by Smith (U.S. Pat. No. 7,860,760) enables the bypassing of much of the data processing required in survey research and moves directly to triggered actions based upon thresholds or triggers set by researchers or physicians or others engaged in risk management as data is accumulated in real time. Post hoc analysis of the collected data is still available, but the delay between input related to known risks or risk thresholds and initiation of alerts is eliminated. Art introduced by Smith (Ser. No. 12/932,798) enables the weighting of input sources and the weighting of targets for observation and can be integrated with the art of Smith (U.S. Pat. No. 7,860,760) to improve relevance, timeliness and utility of data collected. The invention described herein is a Continuation in Part of Smith (Ser. No. 12/932,798). If contributors of data enter responses and observations into protocols that are sufficiently well formed and constructed, and are enabled to offer sufficient detail or context regarding;

the behavior and impact of a person providing a service,
the consequences or side effects of use of a product or performance of a procedure,
the consequences or results that emerge following the provision of a service or use of a product,
and consequences or results that follow the implementation of a process or procedure, the quality and utility and appropriateness of the data and the resulting response to analysis and interpretation may be enriched.

Eliminating the complexities of enrollment of contributors and other participants and bypassing the multiple steps and processes required for analysis prior to action enables risk management to be more efficiently and effectively managed on a larger scale and can leverage the art in Smith (U.S. Pat. No. 7,860,760) without sacrificing the quality of the data collected. However, without social and monetary incentives to encourage enrollment, or without monetization of the enrollment transaction as introduced by the system and method of the invention described herein, the volume of real time collection of observations from widely dispersed sets of enrollees in real time is likely to be lower, resulting in slower accumulation of data that might trip a risk and notification trigger or threshold. The combination of a simple enrollment process with rewards and incentives and monetization of the process for enrollment will facilitate a robust and continuous supply of actionable real time data. Conversely, providing access to portions of a data supply chain or actions generated through a data supply chain enables fees and payments to be charged to those who benefit from the data supplied or accessed.

The emergence and wide distribution of smart phones and other electronic devices capable of implementing computer readable code expands the technological capacity to include end users of products and services into rigorous research processes efficiently and automatically. In the event of national regional or local emergencies, these electronic devices can enable tracking the distribution, utilization, and impact of resources or assets. Further, it can enable receipt of continuous feedback from emergency responders or citizens in possession of said resources or assets to improve decision making regarding levels of risk, prioritizing allocation of resources, and other factors. Enrolling both emergency responders and citizens rapidly and efficiently into real time contributions of data to datasets of value to governmental or regulatory agencies and other stakeholders or entities for the regulation, management, or reduction of risks to public health or welfare is essential, for managing emergency and crisis situations. Linking the user of the resource, the provider of the resource, ad hoc or pre-validated research protocols, and real time triggering of alerts and notifications can enable truly flexible real time responses to emergency situations.

Users and producers of data in the various forms of databases, data tables, streams of data from RFID tags, data generated by and through messaging services and social networking sites, and data generated by the multitude of electronic devices capable of implementing computer readable code will benefit from improved and additional tools for enrolling voluntary contributors of data into a data supply chain. The invention described herein addresses a system and method for achievement of a subset of a data supply chain we have labeled C1 in the group of four fundamental components of a data supply chain we label as "Delta4C:"

1. C1=Connect and enroll all involved parties or participants rapidly and effectively from a distributed network to properly include and assign observers into a process for data contribution
2. C2=Collect real time observations from a full circle of contributors with variable weighting for reputation and access to relevant information
3. C3=Compute the values and ratings of accumulated observations to assess whether thresholds for risks or alerts have been met or surpassed
4. C4=Communicate or notify the right parties regarding information that is actionable for them.

The method and system of the invention described herein focuses won the term labeled "C1" in the list and enables rapid enrollment of end users of products or goods and services as contributors of real time actionable intelligence and information to be used to reduce risks in times of national emergency as well as collect routine incremental observations. The method and system will also enable implementation of transaction fees and charges to be paid to the provider or vendor doing the enrollment and also enable the producer of the product or service to implement rewards, fees, bounties, coupons, and other incentives for contributions of data to a data supply chain. Using the system and method, FDA, CDC, HSA, FEMA, DOD and other agencies or entities may accumulate input from dispersed contributors; including observations of the utility, effects, impacts, outcomes, side effects, associated risks, advantages, quality or other measures, and numerical ratings useful for assessing a manufactured item or service or process. Indeed, the system and method can be applied to any subject or topic for research, such as biological or social or environmental interactions. The system and method of the enrollment process may be enriched to include sufficient information about enrollees to enable real time notifications and communications to be tailored to inform and instruct enrollees and emergency responders of actions to undertake in response to emergent or unique situations.

The FDA has begun to consider tools and mechanisms for a "flexible, nimble system to produce medical countermeasures rapidly in the face of any attack or threat, known or unknown," and the rapid enrollment of contributors to the data supply chain of observations regarding risks and liabilities along with the notification processes will facilitate achievement of that objective. The data supply chain and accompanying infrastructure will enable the goal of the FDA's MCMi regulatory science program (Pillar II): "to facilitate, simplify, and speed the development and evaluation of medical countermeasures by . . . risk communication to improve public health outcomes, . . . and real-time tracking and evaluation of MCM safety and efficacy during public health emergencies." There are significant benefits to meliorating risks through capturing real time observations from a full circle of observers and to proactively notify providers, patients or other recipients of services or products, as well as manufacturers and service providers as risks are identified. Easing processes to enable every responsible party and every user of a medication or medical device or product or service to contribute weighted, vetted, context rich data regarding side effects, drug interactions, contamination, manufacturing defects, or other potential concerns before they endanger larger groups of consumers or escalate into liabilities will make consumers safer and provide emergency responders with actionable intelligence as they formulate policy and determine courses of action. The richer the information regarding the contributor of data, such as the contributor's medical history or genetic map or demographic information, the more comprehensive the analysis and interpretation of the interaction of the contributor and the product or service. Conversely, the richer the information regarding the product or service itself and the provider of the product or service, the more comprehensive the analysis and interpretation of the interactions between persons performing a service or between products or services and those who receive the services or products. Generating and assigning matrix or other codes or biometric data to potential participants in a data supply chain can leverage any of the information the enrollee chooses to contribute or make available to the research process as well as facilitate the automation of registration or subscription, assignment and transfer of payments and fees and other incentives, and assignment of the enrollee to the proper subset of systems and processes and research protocols within a data supply chain.

BRIEF SUMMARY OF THE INVENTION

Users and producers of data in the various forms of databases, data tables, streams of data from RFID tags, data generated by and through messaging services and social networking sites, and data generated by the multitude of electronic devices capable of implementing computer readable code will benefit from improved and additional tools for enrolling contributors of data into a data supply chain. The invention described herein introduces art to utilize strings of computer readable characters or biometric data captured through electronic devices or matrix codes or in purely digital strings to enroll participants into a data supply chain. Data may be physically embodied as printed QR Codes and other computer readable matrix or two dimensional codes or bar codes readable or photographable by tag readers or electronic devices with wireless and electronic transmission capabilities. Said devices, such as smart phones or electronic devices will transmit the images or digital data streams to a server or other electronic device or website to enroll participants into a data supply chain. In some cases where the data itself is housed upon an electronic device, such as the medical history of a patient or the employment and job assignment of an emergency services worker, the data may be transmitted without the intermediate step of converting it from a matrix code or other data string. The invention described herein will enable the optional use of electronic devices to generate computer readable code to configure, format, and generate an electronically readable identification code such as a matrix code or a character string to print or encode directly upon any product label or upon a receipt for a product or service; or upon a page or poster or card associated with a product or service; or upon a magnetic medium such as a metallic strip attached to a plastic card. The generated code may additionally include UPC codes and other point of sale codes that can be read and transmitted electronically when an exchange or sale is made or a service or product is distributed. The generated code may also include biometric data. To prevent unauthorized modification of data encoded in the electronically readable identification data string or biometric data or QR Code, it may be digitally signed or other authentication and security protocols may be included in the code creation process or the electronic transmission process.

The data string is transmitted to an electronic device or server capable of reading it to enable linking the user or purchaser of the product, service, or procedure to the correct research protocol or plurality of research protocols within the data supply chain. The transmission of strings of data captured from electronically readable identification data strings or matrix codes associated with one or a plurality of products or services or procedures enrolls the user or purchaser into the respective data supply chain. The electronic device transmitting the data string may also implement computes readable code to read instructions from a portion of the string of data associated with a product or service or procedure or person providing a service to automate a link to the server or device performing the enrollment or housing or hosting the data entry or research protocols; enabling the user of the device to enter additional information, such as a unique password or other registration information not contained within the transmitted data string. Thus, the invention described herein will use computer readable code to configure, format, and generate an electronically readable identification string of data or a matrix code or a string of computer readable characters or a string of biometric data to assign to a potential contributor or participant in a data supply chain. The act of a smart phone or other electronic device photographing and transmitting the electronically readable identification code to enable enrollment will automatically connect the user to a web page or electronic device acting as a server according to instructions embedded within the data string or matrix code regarding:

1. The fee to collect from an organization or business or agency for enrolling the consumer or user of the product or service into a data supply chain;
2. Presentation upon the server of one or a plurality of screens or forms to enroll the consumer or user and accept input regarding said user's logon, passwords, identity and roles within a data supply chain;
3. Connection to one or a plurality of designated research or data collection protocols or research protocols or forms assigned to the service or product being registered by said enrolled user;
4. Implementation of the fee or payment or amount or award or other form of recognition or exchange to be offered or paid to said enrolled consumer or said user enrolled for contributions of data to said research protocols;
5. Implementation of the rights and roles assigned to said enrolled consumer or said user of the product or service to enter observations regarding the product or service;
6. Assignment of rights and roles assigned to said enrolled consumer or said user of the product or service to configure processes for notification and alerts if calculations applied to data exceed thresholds set by the manufacturer, the service provider, the agency or organization, or said enrolled user respectively;
7. Assignment of rights roles fees and charges assigned to said enrolled consumer or said user of the product or service and to others enrolled into the data supply chain to receive notification and alerts or other server actions if cumulative calculations trip a trigger or achieve a threshold.
8. Designation of rights roles fees and charges assigned to said enrolled user entitled to access portions of the data supply chain.

The act of a user of a smart phone or other electronic device photographing and transmitting an electronically readable identification data string or matrix code or string of biometric data assigned to said user will enroll said user automatically and post the designated data onto the receiving server. In some instances, that data might be sufficient to connect the enrollee into the data supply chain without further action on the part of said enrollee; in others, said enrollee may be presented with fields or forms to enter further information to complete registration or subscription of said enrollee and integrate said enrollee into a data supply chain.

If an electronically readable identification data string generator or RFID tag or a matrix code generator or a point of sale device is capable of transmitting to and connecting directly with the server hosting or managing the data supply chain connects with said server through an electronic device associated with an enrolled user, the electronically readable identification data string generator or RFID tag or matrix code generator or point of sale device or said server can transmit and post an update or modification to the data string or matrix code associated with said enrolled user or participant. This bilateral transmission may enable said user or participant to be assigned new roles or rules or rights. The potential for reducing risks and improving outcomes through this two-way dialogue of iterative updating is tremendous. In addition, offering a user an option to implement a link from the server to the electronically writable medium holding the data string or matrix code of said user or participant will enable real time or continuous upgrading of said user or participant's medical record and other information embedded within the identification data string or matrix code if that data is obtained internal to the respective data supply chain. Said updated identification data string or matrix code can then be made available for many purposes, such as automating the transfer of data when signing into an emergency room or transferring medical information to a new physician. Fees for updating the identification data string or matrix code assigned to the user or participant may be used to defray fees accrued to be paid to the participant for contributions of observations. Other payment and pricing alternatives will be evident to those skilled in the art of pricing for updates and for contributions using means other than those that are unique to the invention described herein.

DETAILED DESCRIPTION OF THE INVENTION

Figure 1:
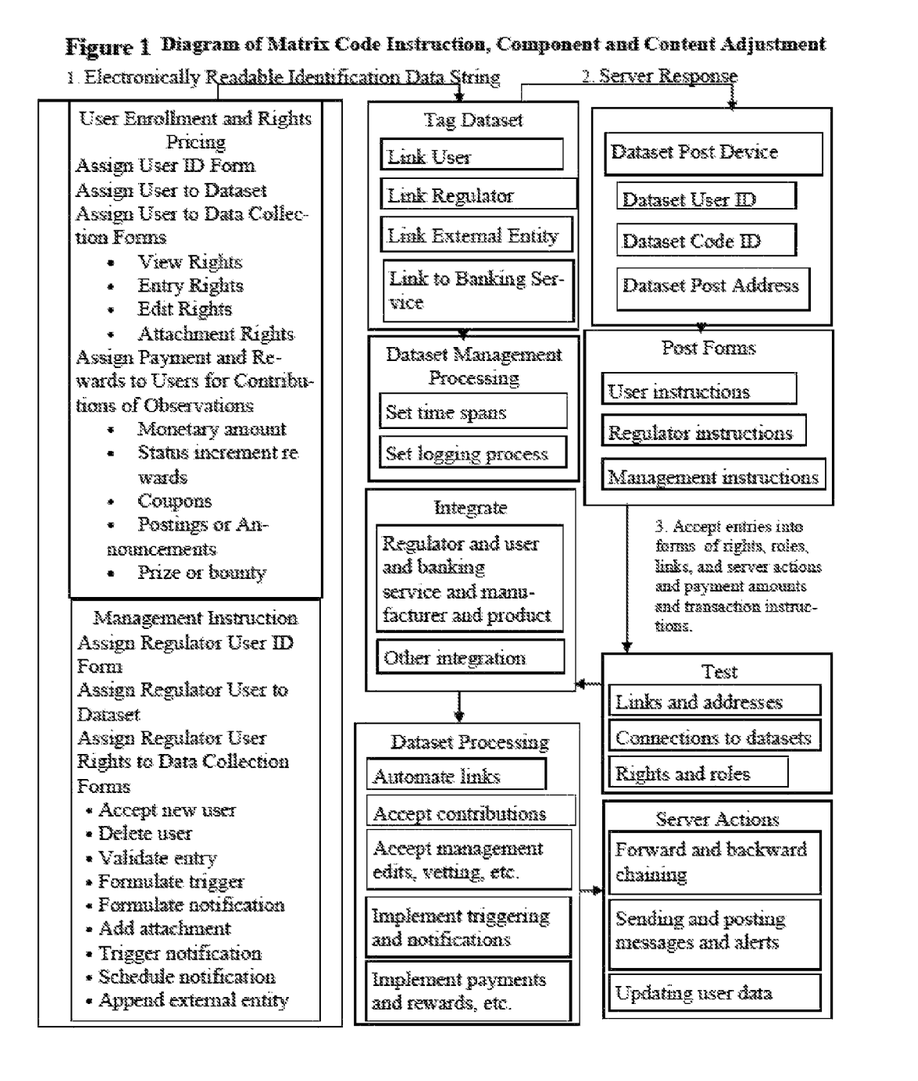
FIG. 1 "Diagram of Matrix Code Instruction, Component and Content Adjustment" diagrams how a server implements data strings or matrix codes to enroll users into assigned datasets, and manages those datasets and integrates them with testing, processing, user rights, and fees and charges to post to forms and update and transmit or receive notifications and reports.
Figure 2:
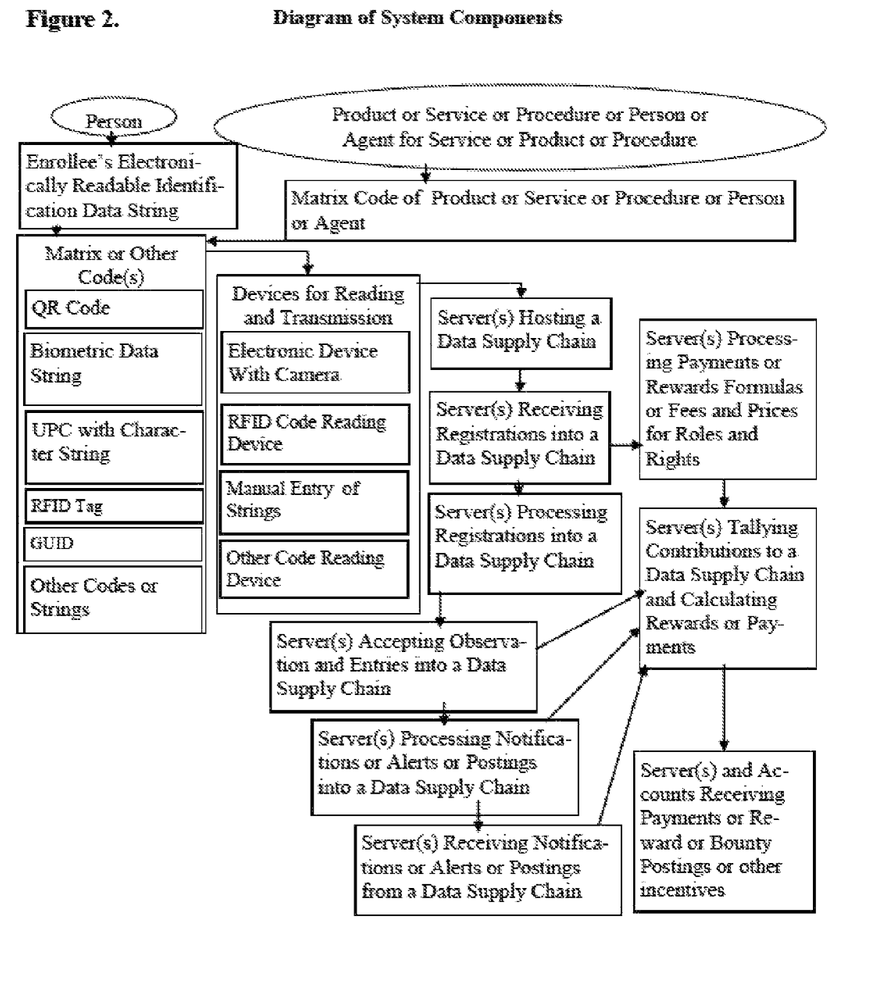
FIG. 2 "Diagram of System Components" diagrams how data strings or matrix codes assigned to the enrollee and the product or service are linked to electronic devices with camera and transmission capabilities and servers housing and processing datasets.
Figure 3:
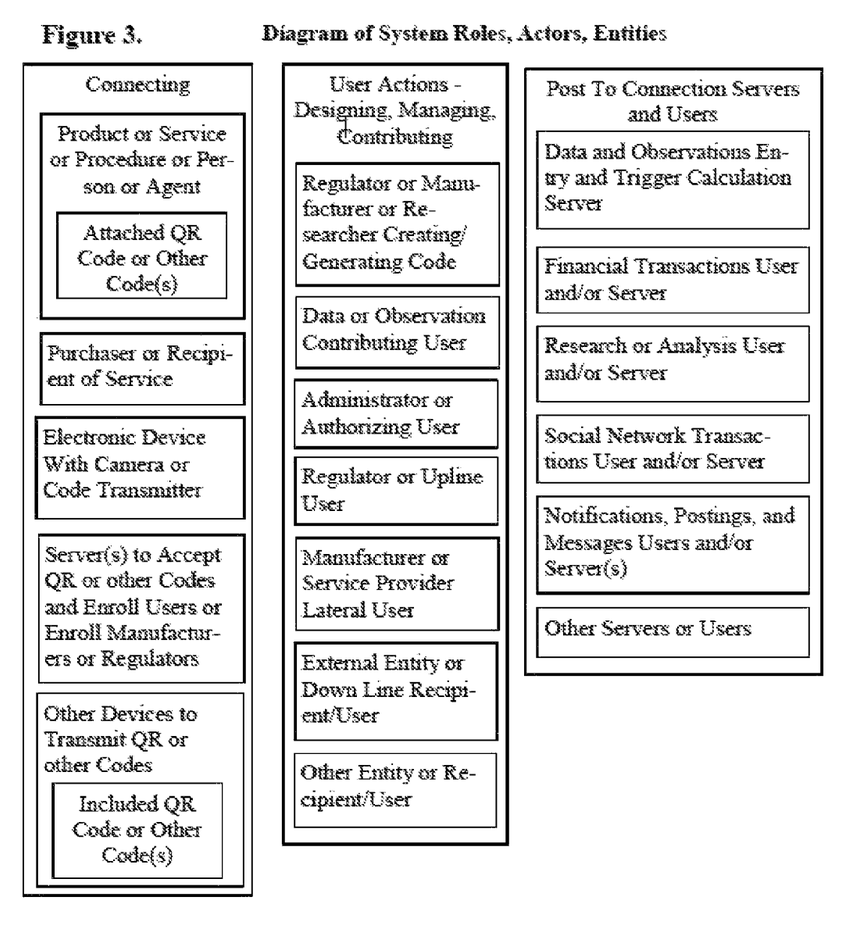
FIG. 3 "Diagram of System Roles, Actors, Entities" diagrams how users, servers, and other entities connect to the dataset through matrix codes or data strings and how assigned roles and rights to design, manage, and contribute observations, process payments and other rewards are arranged in a typical embodiment of the invention described herein.
Figure 4:
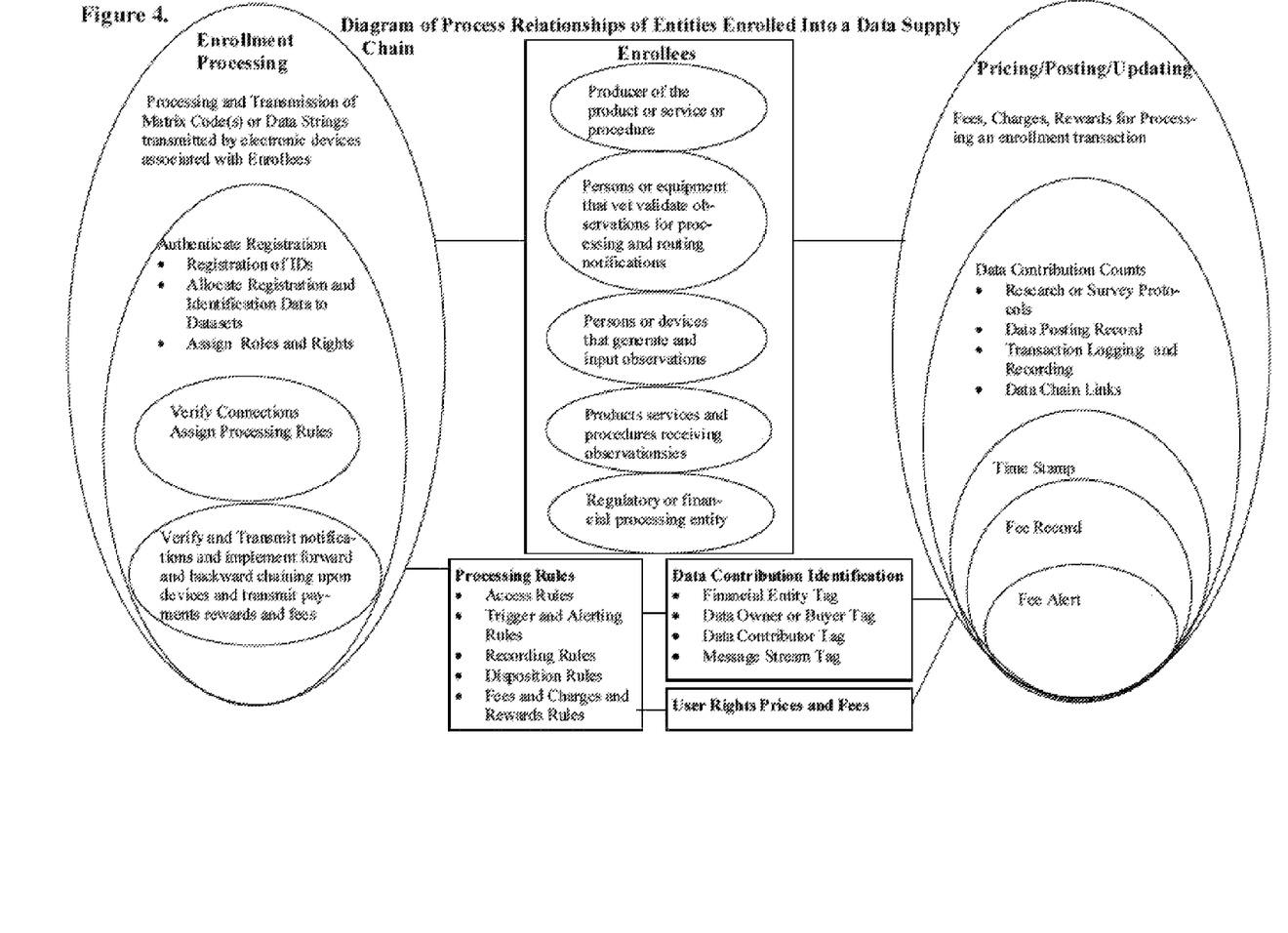
FIG. 4 "Diagram of Process Relationships of Entities Enrolled In the Data Supply Chain" diagrams the types of enrollees and how their registrations or subscriptions are processed and linked to fees, charges, payments and other reward calculations in a typical embodiment of the invention.

Several problems consistently disrupt or prevent continuous collection and real time distribution of actionable data about risk:

Data collection and utilization is inconsistent
Enrollment of contributors is complex
Data is dispersed
Data is delayed
Collection is intermittent (everyone reports on their own schedules) and incoherent (continuity and consistency across protocols is essential for real time research)
Data is insufficient (recipients of medications [patients] know most about the impact of the drug on them, but do not usually have the tools or training to know how to contribute that information in real time or in a structured manner)
Data is not vetted or validated by appropriate auditors or researchers
Intervening variables associated with the participant (patient), such as their genetic map or medical history or demographics, can significantly qualify the interpretation of the collected data
Data input does not conform to regulatory standards or requirements making reporting or data output difficult to compare against standards or requirements
Absence of tools for triggering actions based on data available to risk managers Relevant information about the person contributing the data or consuming the product and/or service is not linked to the data collection process, but housed separately Relevant information about the vendor or provider or the individual delivering or implementing the service or product is incomplete or unavailable.

A partial solution to these problems is available through the system and method of the invention herein to rapidly enroll participants into real time research processes, especially if said participants are enabled to offer some or all relevant demographic information, biometric data, medical history, and individual genetic information upon enrollment through transmission of data drawn from a matrix code or other structured and ordered data associated with said participants. Enabled through the electronically readable identification code or matrix code associated with an enrollee or participant are computer readable instructions to the device or server accepting the electronically readable identification code or matrix code to enable said enrollee to participate and make contributions through a system and method to:

- Post/offer and discover data to a central location from participants (patients, providers, regulators, and pharmaceutical companies or manufacturers or service providers);
- Push and pull data from the full circle of contributors in real time;
- Collect and federate data through rigorous protocols that comply with regulatory standards and requirements;
- Collect and curate rated, vetted, scored, and structured data along with searchable context-rich narratives;
- Enable real time data accumulation from participants who are observing risks and impacts of the services or products;
- Enable links to governmental regulatory agencies and other stakeholders;
- Provide a self-service interface for simple data sharing that conforms to regulatory requirements and standards;
- Use triggering to process and construct notification or alerts about actionable data and potential risks;
- Automate notification of the right party—even patients and providers as regulatory or risk profile thresholds get tripped by triggers;
- Leverage social networks to increase numbers of observations;
- Leverage social networks to distribute postings of alerts;
- Generate, upon distribution or receipt of a service or product, a data string or matrix code to enable a handshake or link between the enrollee or registrant or data contributor and the rest of the supply chain for the service or product;
- Utilize cameras in smart phones, scanning lasers, and other sensors or mobile devices to capture data strings or matrix codes for decoding to enable direct links to servers able to enroll participants into the data gathering process and assign said participants to research protocols;
- Enable a data entry or observation collection interface to be initiated upon first use of the service or product or when a purchaser voluntarily opts to become a participant or enrollee into the data gathering or risk management system;
- Enable regulators or experts to vet and validate data as it is input into the system to ensure relevance, utility, accuracy, data quality, priority or urgency, and maintain data consistency;
- Post and link vetted observations to regulatory or research or quality control datasets external to the primary dataset(s);
- Notify and/or perform other automated actions based on set schedules or upon changes to data;
- Collect transaction fees and distribute rewards, bounties, prizes, social recognitions and incentives, and payment for contributions of observations;
- Collect payment for access to the data within the data supply chain, such as data views, downloads, or receipt of notification or alerts;
- Update demographic, connection, medical, genetic, or other data associated with the enrolled participant as well as the provider of the service or product to the enrolled participant.

A non-intrusive widely available enrollment approach enables even an ordinary purchase transaction to be capable of invoking a connection to a risk management or a product improvement system. In effect, the system and the chain of enrollment and contribution can be invoked and initiated for any product or service that is of interest to national security or national health at the point of discovery as well as any product or service in the private sector that might benefit from continuous real time research or protocol oriented data collection and posting that may result in triggered alerts and/or notifications. In fact, using the system and method of the invention described herein with other art introduced to implement and manage a data supply chain enables any set of people to shape the unfocused disordered data that crosses their transom into ordered and structured processes for notification and alerts. Enrollment in many embodiments of the invention described herein includes implementing a subscription to asynchronous notifications for the enrollee.

The system and method of this invention facilitates fee calculations, assignment, allocation, and exchanges for activities related to enrollment of contributors to datasets and to users who interact with said datasets. The invention described herein introduces art to configure, format, and utilize electronically readable identification data strings or matrix codes, such as QR Codes, biometric data, or other computer readable matrix or bar codes that may be read and transmitted to a server or electronic device or website by smart phone image readers or other electronic devices with camera capabilities or other biometric data capture capabilities in order to enroll and link a user to a data supply chain. Further, in some embodiments of the invention described herein, a combination of one or a plurality of RFID data tags readable by an electronic device and able to connect with communication API's or other methods and conventions for linking of data collected at the point of capture may be included in connection methods used to link to servers or electronic devices included in a data supply chain.

Additional conventions for electronic tags, biometric data capture, and operating system codes may emerge, and the invention anticipates folding these into the connection systems and methods that enable an enrollment process. A connection to at least one server or electronic device participating in a data supply chain is a precursor to enabling the implementation of fees and charges for enrolling contributors and for implementing the transmission of bounties, coupons, awards, rewards and other social or economic incentives to motivate contributors to offer observations in real time with sufficient accuracy and context. To the extent that these supplemental linking processes through antiquated codes such as GUID's or through RFID tags are also able to carry instructions for fees for enrollment and payment and incentives to contributors, the system and method described herein may be adjusted to accommodate these, especially if they extend or improve the universality or efficiency of the enrollment process. Further, to the extent that these supplemental linking processes through codes in addition to data strings or matrix codes, such as biometric data capture devices or RFID tags are also able to carry medical histories, genetic maps, demographic, financial transaction information, and other data regarding the enrollee; an enrollee and data from an enrollee may be assigned to other datasets and protocols within the data supply chain thus automating enrollment into alternate branches of the wider data supply chain. Retaining an authorized chain of ownership and preventing unauthorized modification of data encoded in the electronically readable identification data strings or QR Code or other strings of digital enrollment data can be implemented through many authentication methods and variants of digital signatures or Public Key cryptography techniques or other systems and methods to restrict access and to maintain a history of users and their participation in the data supply chain.

Terms used in the description of the invention described herein, such as "contributor," "enrollee," "participant," "researcher," "person," "entity" and other terms for "user" are interchangeable. Use of the term "enrollee" is generally intended to apply to enrollment of recipients of products or services or behaviors. Use of the term "registration" is generally intended to apply to the other side of the transaction; the vendor or the agent providing a service or procedure, or manufacturer or product itself being used by the enrollee. However, "enroll" or "register" or "subscribe" or variations of these terms are used in the patent described herein to apply to any "user" according to the context of the embodiment. The use of a different term is for purposes of remaining within the context of an embodiment and is not intended to change the definition commonly applied to the term "user" by the USPTO.

An embodiment of the invention can read content or instructions included in a data string or matrix code to assign an enrollee to a position or role within a hierarchy of subordinate lateral, and supervisory relationships. These designated positions or roles can enable an enrollee to validate or vet observations, configure notifications and triggers, route notifications and triggers to other roles and positions within the hierarchy, reassign down line enrollees to research protocols or datasets, and other activities rights and roles indicated within the matrix code or data string. Said designated roles and positions can also be associated with fee or payment allocations and amounts according to respective user's status or role within the hierarchy. For example, the regulator may vet all observations from all contributors to all datasets but receive no fees; the researcher may vet all observations into a specific subset of protocols and receive a payment for vetting each observation; and the physician may vet all observations from contributors who are on his patient roster and receive a credit from the manufacturer of the product or device. A variant of an embodiment of the invention for role assignment can also read and implement content or instructions included in a data string or matrix code to assign an enrollee to a position or role within a hierarchy of roles and rights to download a subset of the data supply chain or view or receive notifications or other server actions.

An embodiment of the invention can also enable enrollment of a contributor some time following the purchase of a product or service if the recipient of the product or service can be identified or contacted and invited to enroll into the data supply chain through email solicitations or other electronic forms or methods or through mailers or personal contact. This embodiment may optionally include a data string or matrix code with already captured medical and other information associated with the potential enrollee, as well as a data string or matrix code for the product or service that is the object of the data collection process for the data supply chain. Another embodiment of the invention can enable any entity engaged in real time research or risk management, such as a federal or state agency, or city, or county, or business to enroll a person into a data supply chain at the point of purchase or check-out or payment or registration for a service or business transaction with that entity. In these cases, links to credit card information or tax information or other electronic datasets containing information about the enrollee may be accessed (with the permission of the prospective enrollee if that is a prerequisite to posting of data associated with said potential enrollee) and data relevant to the enrollee's participation in the data supply chain can be linked or transmitted to the server or electronic device or website implementing the enrollment. The data string or matrix code may include instructions to accept a series of passwords and identifying information to enable a user upon first accessing the server housing the research protocols for the data supply chain to configure their rewards and implement links to banks or other entities involved in financial transactions or services resulting from their participation, including other data supply chains.

Combinations of multiple formats and configurations for data strings including data strings from automatic devices for identity recognition producing biometric data of all types can be folded into any embodiments of the invention described herein. Dependent and independent data strings may be linked and configured or transformed to enable enrollment according to the requirements or instructions of those who manage or implement enrollment into the data supply chain. In one embodiment, the UPC code is embedded into the data string or matrix code and the act of reading the data string or matrix code by an electronic code reader would be similar to a point of sale transaction. In another embodiment, information about a chain of service providers and organizations or agencies would be embedded into the data string or matrix code for posting into data collection processes and systems at a website specified within the data string or matrix code. Yet another embodiment of the invention described herein can be applied to enrollment or registration of employees into an organization, enabling a full circle of citizens or customers or consumers, organizational actors, supervisors, peers, and individual employees to participate in a data supply chain for assessing performance in regard to jobs or work roles or goals. Similarly, citizens or customers or consumers can be enrolled or register to provide observations of service needs or requirements or performance of entities and persons who provide services to them.

The option to receive notifications and the distribution paths and types and methods and contents of the notifications can vary according to the needs and choices of the enrollee or the policies and practices of the organizations or entities enrolling the contributors. In every embodiment, where enrollment occurs using the system and method of the invention described herein, fees and other exchanges may be assigned and designated within the matrix code or data string used to register and enroll the contributor into the data supply chain. An example of how this operates in the pharmaceutical arena is that the physician may be assigned a fee from the manufacturer, the retailer may also be assigned a fee from the manufacturer, the regulatory agency overseeing the side effects of the medication may designate the posting of the name of the physician onto a site for "Preventative Medicine Contributors," the enrolled contributor or user may be assigned a coupon or reward from the manufacturer, the service provider housing the dataset may be assigned a transaction processing fee by the manufacturer or by the regulatory agency or both, and a link to an entity processing financial transactions may implemented and a transfer of funds to one or a plurality of accounts implemented.

The configuration and combination of compensation and incentives to enrollees into the data supply chain may be embedded within the matrix code or data string. The act of reading the matrix code or data string takes the potential data contributing participant into the data supply chain to the correct link to a dataset and carries with it the rights and roles and rules for enabling the contribution as well as the rules and processes for implementing transaction fees and payment methods and processes. In the cave of registration through a data string containing data from an electronic device such as a biometric device, the transmission of the biometric data may include additional data to identify the electronic device or biometric device, the owner of the electronic or biometric device, and a string of data regarding the subject of the biometric reading to be enrolled into the data supply chain.

An enrollment process is available to the manufacturer or vendor of a service or product as well as to their agents, such a subset of their employees. Using the method and system described herein for enrollment of persons, they can enroll their organization or agents into the data supply chain, or they can enable their agents to enroll directly. It is expected that the registration or enrollment by the supplier, manufacturer or provider of the product or service will often be through direct transmission or registration through an electronic device, rather than through an intervening step of transmission of a matrix code or data string; though it is also expected, for instance, that an emergency responder would carry a card or an RFID tag that would link said emergency responder to their registration within the data supply chain to access more detailed or confidential information regarding the status or history or other data of any of the subsets of identity information regarding the person receiving the emergency response, the products or services they have been associated with, the vendors or these products and services, and so forth. Thus, policies associated with participants may also be included within their electronically readable identification data strings.

If a data string or matrix code is already assigned to the user, the user who is opting to contribute data simply transmits the code to the server registering enrollees. The user who is opting to contribute data, but does not have a data string or matrix code assigned, simply enters an email address and/or other contact, routing, payment, and supplementary identification information into forms posted by the website or server or posted upon the electronic device and may also opt to check a checkbox to receive notifications about the product or service. An optional configuration for the system and method may offer the user a form to enter a side effect or a reaction or evaluative response into the research protocol upon enrollment or upon reconnection to the website or server or electronic device housing the enrollment data.

If the data contributing participant in a data supply chain does not have a smart phone with camera capability or requests an alternative to the data string or matrix code, a website or server address and a string of characters may be provided to the potential data contributing participant at the point of exchange or purchase of the product or service. Upon accessing and connecting to the website or server, the potential data contributing participant will be presented with a form to accept the string of characters and register the data contributing participant and provide said participant with access to one or a plurality of data entry forms. In this embodiment, a gateway URL is printed on the item or product or distributed with the service along with the character string to enter when said participants connects to the URL to enable registration through manual entry.

In one embodiment, a participant in a data supply chain may be assigned a data string in a format capable of being embedded into or upon a magnetic strip, or wristband, or RFID tag, or other writable tag accessible to electronic transmission and in compliance with HIPAA requirements. This would enable the original format and content instructions for the data string or matrix code to be overwritten and a revised image to be generated and posted or printed or transmitted. A segment from the participant's health record such as allergies or emergency contact information, financial and insurance information, medical providers, and other details will increase the type and volume and range of data to process for analysis of risks and liabilities and triggering of alerts and notifications when risk thresholds are achieved or passed. The data string or matrix code may also carry information to link to other servers containing further details and information about the participant's health record with those servers responsive only to authorized access codes or signatures, thus protecting confidential data. A variant of this embodiment may enable iterative electronic exchanges between the server hosting data for multiple participants and a participant in possession of his own unique data string or matrix code; that exchange reconfiguring the data string or matrix code of said participant. Thus, a participant is not only able to automatically post a plurality of data items and fields into the data supply chain upon receipt and transmission of the data string or matrix code assigned to said participant, but the data string or matrix code of said participant is able to be modified or updated to improve the utility and quality of the data housed within the data string or matrix code he possesses. For example, a soldier or a hospital patient would carry a transactional history of their observations along with their medical and demographic details within their data string or matrix code, thus enabling providers of services to access a record of their current status upon receipt of permission to read or post or transmit the matrix code string. In a variant of this embodiment, a device capable of collecting and structuring biometric data can be the vehicle for generating the electronically readable identification data string. A further capability inherent in this embodiment is the ability of the person assigned the role of vetting observations or managing the soldier or patient to assign different or additional protocols for input from the soldier or patient as their status shifts due to relocation, severity or changes in the configuration of their condition, use of new medications resources products or services, or exposure to new or different threats to their health or safety.

Fees for updating the data string or matrix code assigned to the participants may be used to defray fees paid to the participant for contributions of observations. The reciprocal connection of a revisable data string or matrix code and a server will also initiate implementation and collection of prices and fees for updates. A variation of this embodiment and of other embodiments described herein may use a plurality of matrix codes that carry the same registration or identity information regarding the user, but can append additional data from each of plurality of matrix codes or biometric data capture sources or devices to the dataset housed upon the server. As matrix code conventions adjust and expand in capability, it is possible a single code or a series of matrix codes can carry a significant amount of data and be used for backup data storage as well as for specific purposes and linkages to a data supply chain. This is not a trivial embodiment because motivating users to become contributors to a data supply chain can also result from their desire to have the convenience of housing their own data on a remote server in addition to the financial or other social rewards resulting from being a participant in a data supply chain.

An embodiment that implements the system and method of the invention for managing behavioral risks utilizes the enrollment process for both the recipient of a service from a person, such as a citizen interacting with an emergency services provider. The citizen is enrolled as a data contributor. The emergency services provider is registered as a provider associated with or linked to the agency providing a service. As the citizen interacts with the agent of the agency providing the service, the agent or the agency may distribute the data string or matrix code associated with the service being provided with the citizen and the citizen then proceeds to respond to research protocols associated with the agent linked to the agency. Applying this embodiment to any customer service activity where the "product" is the interaction of the consumer and the provider of the service will enable the agency to engage in research based continuous identification of best practices. Exchanging recognition tokens or other forms of reward or payment as described in the invention herein will encourage contributions of feedback necessary to determine best practices or identify problematic behavior or unproductive variances in provision of services.

What has been described above includes examples of the system and/or method for the patent described herein. It is not possible to describe every combination of processes or utilities or configurations for purposes of describing the system and/or method of the patent described herein, but one of ordinary skill in the art may recognize that many further combinations and permutations of the system and/or method are possible. Accordingly, the system and/or method of the patent described herein is intended to include alterations, modifications, and variations that fall within the spirit and scope of the appended claims.

Furthermore, to the extent that the term "includes" is used in the detailed description or claims, the term is intended to be a synonym of the term "comprising" as "comprising" is interpreted when employed as a transitional word in a claim.

The invention claimed is:

1. A system for formatting a data siring or matrix code to instruct a server or electronic device to register a user upon receipt of a data string or an image of a matrix code from said user, said system comprising:
an electronic device capable of executing computer readable code including:
an instruction to post or link one or a plurality of products or services or agents associated with the data string of matrix code to a dataset housed upon the server or electronic device receiving the data string or matrix code upon receipt of said data string or matrix code;
an instruction to collect information from the user of the server or electronic device originating the data string upon receipt of the data string by the server or electronic device receiving the data string;
an instruction to accept from the user of the server or electronic device originating the data string or matrix code upon receipt of the data string or matrix code by the server or electronic device receiving the string or matrix code an electronically transmissible address or method of contact from the user of the server or electronic device originating the data string or matrix code;
an instruction to assign the user to the one or a plurality of datasets associated with the one or a plurality of products of services or agents housed upon the server or electronic device receiving the data string or matrix code;
an instruction to assign the user a right to access one or a plurality of data collection forms associated with the one or a plurality of datasets assigned to the user,
an instruction to assign the user a right to access one or a plurality of data collection forms associated with the one or a plurality of datasets assigned to the user,
an instruction to assign the user a right to enter data into one or a plurality of data collection forms associated with the one or a plurality of datasets assigned to the user,
an instruction to assign the user a right to change or edit an observation within one of a plurality of data collection forms associated with the one or a plurality of datasets assigned to the uses;
an instruction to assign the user a right to accept or reject an observation within one or a plurality of data collection forms associated with the one or a plurality of datasets assigned to the user or to another user or role specified within the matrix code;
an instruction to assign the user a right to append or attach a file to an observation within one or a plurality of data collection forms associated with the one or a plurality of datasets assigned to the user or to another user or role specified within the matrix code;
an instruction to charge a transaction fee to be paid by the owner of the one or a plurality of datasets accessed by the user to the owner of the server or electronic device housing the one or a plurality of datasets upon posting of an entry of at least one observation into a data collection form associated with at least one dataset;
an instruction to log and implement a payment transaction of one or a plurality of fees to be paid to the user associated with the one or a plurality of datasets for each data observation or entry accepted by the owner of the one or a plurality of datasets;
an instruction to log and implement a prize or bounty to be delivered to the user associated with the one or a plurality of datasets for a data entry accepted by the designated owner of the one or a plurality of datasets or the owner of the server hosting the one or a plurality of datasets;
an instruction to log and designate one or a plurality of roles or rights with fees or prices or charges to be collected from the user associated with the one or a plurality of roles or rights upon said user accessing one or a plurality of datasets or upon said user being the recipient of one or a plurality of server actions generated by trigger events within the one or a plurality of datasets;
an instruction to log and designate one or a plurality of roles or rights with fees or prices or changes to be collected from the user associated with the one or a plurality of roles or rights upon said user viewing or downloading data from one or a plurality of datasets;
an instruction to log and implement an incremental adjustment of the status label or tag of the uses associated with one or a plurality of datasets for a data entry accepted by the designated owner of the one or a plurality of datasets or the owner of the server hosting the one or a plurality of datasets;
an instruction to assign a user to a position with an organization hierarchy where to the position is subordinate to or superior to a position assigned to at least one other position within an organizational hierarchy;
an instruction to log and implement an incremental adjustment of the set of rights of the user associated with each of the one or a plurality of datasets for a data entry accepted by the designated owner of the one or a plurality of datasets or the owner of the server hosting the one or a plurality of datasets;

an instruction to associate or link an observation to at least one other user associated with the one or a plurality of datasets:

an instruction to associate or link a first user associated with the one or a plurality of datasets to have a right to review or validate or approve an associated or linked observation entered by a second user connected to the first in a subordinate position within a hierarchy;

an instruction to associate or link a first user associated with one or a plurality of datasets to have a right to edit or change one or a plurality of associated or linked observations not entered by the first riser, but by a second user connected to the first met in a subordinate position within a hierarchy;

an instruction to associate or link a particular user associated with one or a plurality of datasets to have a right to append or attach one or a plurality of files to one or a plurality of associated or linked observations not entered by that user;

an instruction to assign a particular user associated with one or a plurality of datasets a right to build one or a plurality of calculation formulae for one or a plurality of observations entered by the user, said calculations having one or a plurality of threshold or trigger values that when achieved may initiate actions and events upon or by the server or electronic device housing said one or a plurality of datasets;

an instruction to assign a particular user associated with one or a plurality of datasets a right to combine one or a plurality of datasets and apply the one or a plurality of calculation formulae for one or a plurality of observations entered by all users associated with said one or a plurality of combined datasets, said calculations having one or a plurality of threshold or trigger values that when achieved may initiate actions and events upon or by the server or electronic device housing said one or a plurality of datasets;

an instruction to assign a user associated with one or a plurality of datasets a right to assign one or a plurality of rating scales to one or a plurality of forms within one or a plurality of datasets;

an instruction to assign a user associated with one or a plurality of datasets a right to design one or a plurality of notifications or emails or to designate one or a plurality of server actions to perform upon achievement of a threshold value calculated by one or a plurality of formulae upon the one of a plurality of datasets;

an instruction to assign one or a plurality of users associated with one or a plurality of datasets a right to receive one or a plurality of notifications or alerts triggered by one or a plurality of calculation formulae for one or a plurality of observation entered by particular users or by all users associated with said one or a plurality of datasets;

an instruction to designate the one or a plurality of users associated with one or a plurality of datasets a right to receive one or a plurality of screen postings on the respective electronic device of the designated user or to forward instant messages or emails upon achievement of a threshold value calculated by one or a plurality of formulae upon the one or a plurality of datasets;

an instruction to forward the one or a plurality of notifications or screen postings onto the respective electronic device of the designated user or to forward instant messages or emails upon achievement of a threshold value calculated by one or a plurality of formulae upon the one or a plurality of datasets;

an instruction upon connection to forward the one or a plurality of notifications or instant messages or emails upon achievement of a threshold value calculated by one or a plurality of formulae upon the one or a plurality of datasets; plurality of formulae upon the one or a plurality of datasets;

and an instruction to designate one or a plurality of entities that are not assigned user rights to a dataset to be included m the dataset viewing, notification, email, alert, instant messaging, and screen postings triggered by one or a plurality of calculation formulae for one of a plurality of observations entered by all users associated with said one of a plurality of datasets.

2. The system as in claim 1 wherein the registering of one of a plurality of users to link to one or a plurality of datasets may be for a designated time span.

3. The system as in claim 1 wherein fees for processing a registration are collected through interact banking services.

4. The system as in claim 1 wherein fees and payments for contributions of observations from enrolled users are paid through internet banking services.

5. The system as in claim 1 wherein an entity such as a person or agent of a vendor or manufacturer or service provider or regulatory agency or financial institution of researcher may use one or a plurality of the following options to, manually register and post data and updates to data regarding the identity and the identity of the entity they represent to include one or a plurality of data items of demographic and other information to be linked to users who are contributors of observations;

transmit from an electronic device a matrix or electronically readable identification code to register and post data and updates to data regarding their identity and the identity of the entity they represent to include one or a plurality of data items of demographic and other information to be linked to users who are contributors of observations;

and transmit a string of data from an electronic device capable of transmitting computer readable code to register and post data and updates to data regarding the/r identity and the identity of the entity they represent to include one or a plurality of data items of demographic and other information to be linked to users who are contributors of observations.

6. The system of claim 1 wherein an entity not assigned full or all user rights may be:

included in the notification, email alert, instant messaging, and screen postings triggered by one or a plurality of calculation formulae for one or a plurality of observations within said dataset for a designated time span;

included in the notification, email, alert, instant messaging, and screen postings triggered by one or a plurality of calculation formulae for one or a plurality of observations within said dataset for a designated protocol or data collection form;

required to pay fees for dataset views or other methods of dataset access;

and required to pay fees for notifications, emails, alerts, instant messages, and screen posting triggered by one or a plurality of calculation formulae for one or a plurality of observation within said dataset.

7. The system as in claim 1 wherein an electronic device that transmits a matrix code or other electronically readable identification code may receive an instruction from said matrix or electronically readable identification code to transmit data associated with said electronic device to be included in the enrollment data.

* * * * *

UNITED STATES PATENT AND TRADEMARK OFFICE
Certificate

Patent No. 8,271,346 B1

Patented: September 18, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Stan Benjamin Smith, Fort Mill, SC (US); Joseph Tate, Durham, NC (US); and Reed Altman, Raleigh, NC (US).

Signed and Sealed this Twelfth Day of March 2013.

JEFFREY A. SMITH
*Supervisory Patent Examiner*
Art Unit 3625
Technology Center 3600